(12) United States Patent
Barri

(10) Patent No.: US 7,106,699 B2
(45) Date of Patent: Sep. 12, 2006

(54) METHOD FOR SHARING INTERNAL EXCESS BANDWIDTH BETWEEN OUTPUT AND INPUT TERMINATION MODULES OF A SWITCHING NETWORK

(75) Inventor: Peter Irma August Barri, Bonheiden (BE)

(73) Assignee: Alcatel, Paris (FR)

( * ) Notice: Subject to any disclaimer, the term of this patent is extended or adjusted under 35 U.S.C. 154(b) by 1036 days.

(21) Appl. No.: 09/963,517

(22) Filed: Sep. 27, 2001

(65) Prior Publication Data
US 2002/0041600 A1 Apr. 11, 2002

(51) Int. Cl.
*H04J 3/16* (2006.01)
*H04L 12/56* (2006.01)

(52) U.S. Cl. ............ 370/235; 370/395.21; 370/395.41; 370/443

(58) Field of Classification Search ............ None
See application file for complete search history.

(56) References Cited

U.S. PATENT DOCUMENTS

| | | | |
|---|---|---|---|
| 6,408,005 B1 * | 6/2002 | Fan et al. ............ | 370/412 |
| 6,483,839 B1 * | 11/2002 | Gemar et al. ......... | 370/395.42 |
| 6,570,854 B1 * | 5/2003 | Yang et al. .......... | 370/236.1 |
| 6,570,883 B1 * | 5/2003 | Wong ................ | 370/412 |

FOREIGN PATENT DOCUMENTS

EP 0 678 997 A 10/1995
EP 0 977 405 A 2/2000
EP 1 025 856 A 8/2000

OTHER PUBLICATIONS

Wallmeir E et al.: "Traffic Control In ATM Switches with Large Buffers", ITC Specialists Seminar, NL, Leidschendam, KPN Research, vol. Seminar 9, Nov. 7, 1995.

* cited by examiner

*Primary Examiner*—Doris H. To
*Assistant Examiner*—Soon D. Hyun
(74) *Attorney, Agent, or Firm*—Sughrue Mion, PLLC

(57) ABSTRACT

A method for sharing internal excess bandwidth between output and input termination modules of a switching network including a switch core fabric (FC) via which a plurality of input termination modules (ITM1 to ITMn) communicate with a plurality of output termination modules (OTM1 to OTMm) through at least a point-to-point transmission channels considered as corresponding each to a virtual ingress-to-egress pipe (VIEP). Sharing of internal excess bandwidth is obtained by successive steps including a minimum bandwidth request calculation step, each request being transmitted to an output termination module for obtaining a minimum bandwidth grant in return. The minimum bandwidth request and grant related to an input termination module linked by an ingress-to-egress pipe to an output termination module are both calculated for a determined number K of relative administrative weights corresponding each to a different quality of service, with a different request and a corresponding grant for every weight.

3 Claims, 2 Drawing Sheets

METHOD FOR SHARING INTERNAL EXCESS BANDWIDTH BETWEEN OUTPUT AND INPUT TERMINATION MODULES OF A SWITCHING NETWORK

BACKGROUND OF THE INVENTION

The present invention relates to a method for sharing internal excess bandwidth between output and input termination modules of a switching network, to a switching network and more specifically a broadband switching network for applying such a method and to a communication network including such a switching network.

It relates more specifically to networks having a multipath self-routing switch fabric and means for distributing bandwidth between connections of different termination modules.

It is assumed that, in such a network, incoming traffic is waiting in the input termination modules to be transferred to the output termination modules via the switch fabric. This switch fabric is preferably made of modular switching elements with each a small internal buffer memory.

The available resources corresponding to the available bandwidth on the links between output termination modules and switch fabric and on the links between switch fabric and input termination modules, are allocated by a connection admission control CAC function for connections to be provided with a guaranteed bandwidth and by an internal distributed rate based flow control IDRFC function for the allocation of the available internal excess bandwidth to other connections. This IDRFC function is based on a distributed arbiter function, which periodically renegotiates the excess bandwidth allocation between output and input terminations modules at the level of which it is located.

Till now such an IDRFC function has no means for taking account of the level of quality of service required for a specific flow to be transmitted by means of a connection which is not under control of the CAC function. Consequently, network operators do not have any means for applying a Quality of Service policy corresponding to their needs to dynamically share the internal excess bandwidth between input and output termination modules of a broadband network controlled as indicated above.

SUMMARY OF THE INVENTION

An object of this invention, therefore, is to provide a method for sharing internal excess bandwidth between output termination modules and input termination modules of a switching network, such as for instance a multipath self routing switching network or a broadband network, including a switch core fabric by means of which a plurality of N input termination modules communicate with a plurality of M output termination modules through at least point-to-point transmission means considered as corresponding each to a virtual ingress-to-egress pipe, excess bandwidth sharing being realized, e.g. cyclically, for the bandwidth remaining available after bandwidth reservation for traffic with guaranteed bandwidth, sharing of such a remaining bandwidth being obtained by means of successive steps including at least a minimum bandwidth request calculation step by a determined input termination module for an ingress-to-egress pipe by which it is point-to-point linked to a determined output termination module, said minimum bandwidth request being transmitted to the determined output termination module for obtaining a minimum bandwidth grant in return from this output termination module.

According to the invention, the minimum bandwidth request and grant related to an input termination module linked by an ingress-to-egress pipe to an output termination module are both calculated for a determined number K of relative administrative weights corresponding each to a different quality of service, with a different request and a corresponding grant for every weight.

An example of traffic with guaranteed bandwidth is for instance Internet Protocol IP traffic according to the expedited forwarding (EF) differentiated services class (diffserv). An example of traffic for which the remaining bandwidth is available is for instance Internet Protocol IP traffic according to the assured forwarding (AF) differentiated services class (diffserv).

It has to be remarked that at least point to point transmission means, as stated above, might be implemented by a real point to point transmission pipe, but it might be implemented as well by means of a point to multipoint transmission pipe. Indeed the principle of the present invention is applicable in a switching network that realizes a point to multipoint transmission between an input termination module and a plurality of output termination modules.

Another object of this invention is to provide a switching network including a switch core fabric by means of which a first plurality of input termination modules communicate with a second plurality of output termination modules through at least point-to-point transmission means considered as corresponding each to a virtual ingress-to-egress pipe. Said switching network includes means for sharing a bandwidth which is available at the level of the switch core fabric between input termination modules according to requests of said input termination modules and to the traffic possibilities at the level of output termination modules in relation with a present traffic situation. Said switching network also includes bandwidth reservation means for traffic with guaranteed bandwidth. Said means for sharing the available bandwidth includes means for sharing excess bandwidth remaining available after bandwidth reservation for said traffic with guaranteed bandwidth, according to successive steps including at least a minimum bandwidth request calculation step by a determined input termination module for an ingress-to-egress pipe by which it is point-to-point linked to a determined output termination module. Said minimum bandwidth request is transmitted to the determined output termination module for obtaining a minimum bandwidth grant in return from this output termination module.

According to the invention, said means for sharing excess bandwidth comprise means for calculating minimum bandwidth requests and grants related to an input termination module linked by an ingress-to-egress pipe to an output termination module, for a determined number K of relative administrative weights corresponding each to a different quality of service, with a request and a grant calculated for each weight.

Another object of this invention is to provide a communication network including at least one switching network as defined above.

BRIEF DESCRIPTION OF THE DRAWINGS

These and other objects, advantages and features of the invention will become apparent from the following description thereof taken in conjunction with the accompanying drawings below listed.

DETAILED DESCRIPTION OF THE INVENTION

Figure 1:
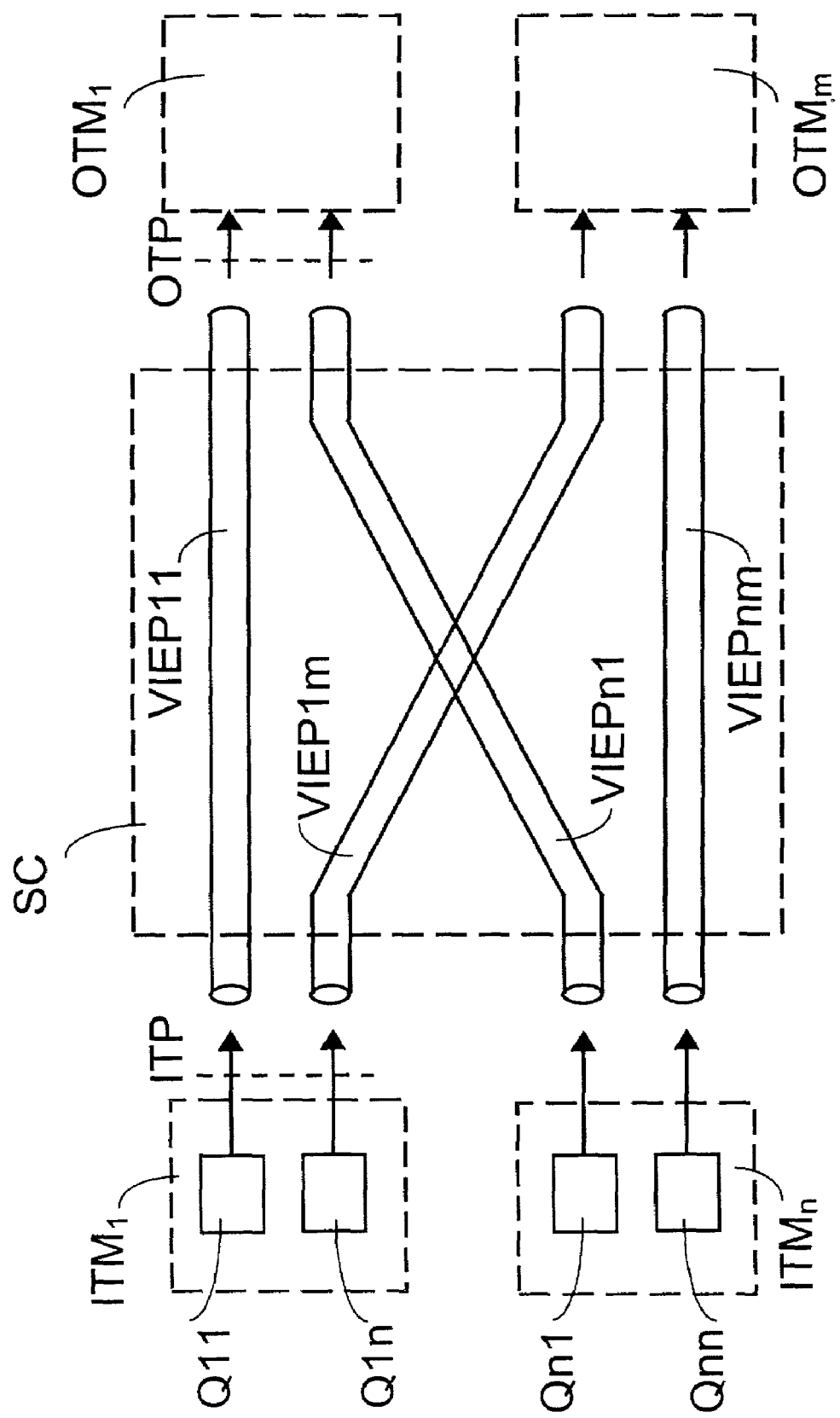
FIG. 1 is a schematic overview of an unfolded multipath self-routing broadband switching network.

A broadband switching network is illustrated as preferred embodiment on FIG. 1, it corresponds to a multipath self-routing network having a switch core fabric SC, by means of which a plurality of N input termination modules ITM1 to ITMn possibly communicate with a same number of output termination modules OTM1 to OTMn, being assumed here a symmetrical arrangement of termination modules.

Communications between termination modules, via switch core SC, are considered, for bandwidth distribution control, as established by means of virtual ingress-to-egress pipes VIEP, such as VIEP11, VIEP1n, VIEPn1 or VIEPnn, point-to-point linking the input termination modules with the output termination modules, in this non-limiting example.

Information are transmitted in the switching network by means of internal cells in an asynchronous mode allowing transmissions with a guaranteed quality of service, for e.g. real time transmissions as well as bursty transmissions. Each virtual ingress-to-egress pipe VIEPi,j transmit a rate controlled flow of cells from one given input termination module ITMi acting as a source, and at least one given output termination module OTMj and can be considered as a virtual aggregate connection through the network switch core SC, such an aggregate connection having multipath properties.

Each virtual ingress-to-egress pipe receives incoming cells from an individual unicast queue, i.e. a queue unit Q, or a schedular system, of an input termination module ITM, such as queues Q11 and Q1n in input termination module ITM1, for pipes VIEP11 and VIEP1n, as well as queues Qn1 or Qnn, in input termination module ITMn, for pipe VIEPn1 or VIEPnn. Each individual queue Qi,j temporarily stores the incoming cells to be transmitted from the input termination module ITMi to which it belongs before releasing them through pipe VIEPi,j.

As already known, a set of thresholds is associated with each individual queue Qi,j and each threshold value corresponds to a transmission rate bandwidth request from this queue Qi,j through pipe VIEPi,j. The bandwidth request is sent periodically from the input termination module ITMi to the output termination module OTMj.

As indicated above, the switch core fabric SC is e.g. made of modular switching elements with respective small individual buffer memories, such elements and memories being not illustrated on FIG. 1.

Each access interface of a port ITP for an input termination module ITM or of a port OTP for an output termination module OTM has an aggregate physical access bit rate APABR with a fraction of it corresponding to a global access bandwidth GAB, this last being the current maximum usual bandwidth at switch access level for internal cell traffic load. As known, the global access bandwidth depends on the bandwidth availability of the multipath self-routing switch core, the operation mode and the network processor type.

A primary input for internal distributed rate based flow control or IDRFC function is a need for bandwidth NFBQ parameter per pipe VIEP.

The currently available bandwidth at a port ITP for bursty traffic, i.e. traffic without guaranteed quality of service and/or real-time transmission, corresponds to:

$$A = GABITP - SCACR$$

SCACR corresponding to the sum of cell rates allocated by a connection admission control function CAC.

Every input termination module pre-processes an offered need for bandwidth input parameter NFB per pipe queue VIEPQ. A bandwidth request of a pipe VIEP queue is compulsorily less than the currently available bandwidth A for bursty traffic at port ITP level. Therefore, an eligible bandwidth request per queue EBRQ parameter per VIEPQ pipe queue is calculated. The need for bandwidth NFB per queue is bounded by the available global access bandwidth GAB at the ITP/OTP port and it is decreased by the already allocated bandwidth for non-real time NRTBWCQ by connection admission control function CAC. The eligible bandwidth request per queue is defined by the formula:

$$EBRQ = MAX\{0, MIN[MIN(NFBQ, GABITP, GABOTP) - NRTBWCQ, A]\}$$

If the sum of all eligible request parameters EBRQ, in an input termination module ITM, i.e. the sum S EBRQ exceeds the currently available bandwidth A, there is some risk that the subsequent grants by the output termination modules OTM might altogether exceeds A if they are only based on the eligible request parameters EBRQ.

Switch resources could be wasted, with available bandwidth allocated and reserved by an output termination module and not usable at input termination level. In order to avoid such a waste, a minimum bandwidth request parameter MBRQ is calculated on a per pipe VIEP basis by every input termination module as it allows an improved bandwidth distribution by output termination modules, with a weight fair sharing WFS of the currently available bandwidth over the respective eligible request parameters EBRQ An allocation is made according to the following rules:

if the sum SEBRQ>A then MBRQ=A*EBRQ/SEBRQ if the sum SEBRQ<=A then MBRQ=EBRQ

The difference between the eligible bandwidth request parameter EBRQ and the minimum bandwidth request parameter MBRQ corresponds to a differential request parameter or supplementary bandwidth request SBRQ. Up to here, a couple of per VIEPQ pipe queue request parameters, such as MBRQ, SBRQ has been defined for every input termination module ITM.

Remaining bandwidth of the excess bandwidth at the output termination OTM level is distributed on so-called blade weights. It remains available after fulfillment of all minimum and supplementary bandwidth requests, this being explained hereafter.

Accordingly these blade weights are defined on a per point-to-point pipe VIEP basis.

Every input terminal module ITM stores blade weights associated to the pipes VIEP having their respective origins at its level.

These blade weights are, for instance, communicated by an input termination module ITM to the destination output termination module through their common pipe VIEP, as are the minimum and supplementary bandwidth requests MBR and SBR.

In order to minimize drop due to output buffer overflow, any grant of bandwidth by an output termination module OTP is based on a newly assessed global access bandwidth value GAB for this output termination module.

All bandwidth requests from different input termination modules ITM to an output termination module OTM are fairly treated by proportioning the distribution of available bandwidth according to their respective bandwidth request parameters as received.

Each output terminal module OTM calculates the bandwidth grants for all the related pipes VIEP, in up to three steps, on the basis of the set of a minimum and a supplementary request parameters MBR and SBR and of blade weights BAW as received for each pipe. According to two first successive steps, bandwidth distribution by an output termination module is based on minimum and supplementary request parameters MBR and SBR, then on blade weights BAW associated to pipes VIEP for a third step.

Every output termination module needs to know the parameters MBR, SBR and BAW indicated above for every associated pipe VIEP.

The currently available bandwidth at the output termination level for bursty traffic without guaranteed quality of service and/or no real time transmission constraints corresponds to:

$$B = GAB - SCARC; \text{ with}$$

$$SCARC = \text{Sum } OTM(NRTBWC + RTBWC)$$

and being the sum of real time and non real time cell rates allocated by the connection admission control CAC function. RTBWC is the real time bandwidth allocated by connection admission control function and NRTBWC is the non-real time bandwidth.

A set of minimum bandwidth grants MBG is calculated as the weight fair share of B over the various minimum bandwidth requests MBR received by an output termination module OTM from all the input termination modules ITM with which it shares point-to-point pipes VIEP. As soon as there remains currently available bandwidth after taking in account the sum of the minimum bandwidth requests at an output port OTP of an output termination module as obtained from the first step, supplementary bandwidth requests are taken in account for grant of first additional grant FAG. If after taking in account the respective sums of minimum and supplementary requests, there is still more bandwidth available a the level of an output port OTP, it is distributed by weight fair sharing on the basis of the blade weights BAW attached to each pipe VIEP associated to this output port of an output termination module OTM.

Minimum and supplementary bandwidth request grant factors MBRGF and SBRGF, as well as blade weight multiply bandwidth AWMB, are respectively obtainable from the first, second and third steps, as long as currently available bandwidth remains un-attributed. They are respectively communicated to the input termination modules for a final bandwidth allocation phase by so-called IDFRC flow-2 message.

Every input termination module ITM receives a bandwidth grant value for every of its N pipes VIEP and this bandwidth grant value is taken in account at least for the following IDRFC cycle. As briefly indicated before, the available bandwidth through the pipes VIEP from an input termination modules to the output termination modules is allocated by a connection admission control CAC function for connections provided with a guaranteed bandwidth and it is assumed that internal excess bandwidth remains available. Bursty traffic, for instance in relation with Internet Protocol differentiated services and/or integrated services, can beneficial from such an excess bandwidth as soon as some requirements, such as quality of service requirements are taken in account.

According to the present invention, sharing of internal excess bandwidth is obtained with an improved internal distributed rate based flow control IDRFC function taking in account K relative administrative weights in relation with the needs for bandwidth at the level of every input termination module. This need for bandwidth is defined per queue or schedulers system corresponding to an administrative weight K and per VIEP. The improved IDRFC function, as proposed, is a weighted function granting the needs for bandwidth as expressed by the input termination module by means of minimum bandwidth requests MBR according to the relative administrative weights. Different qualities of services are accordingly at disposal for network operators, each corresponding to a different relative administrative weight. As an example, the number K of relative administrative weight corresponds to eight weights for a complete broadband-switching network e.g. an IP diffserv network.

Requests for minimum bandwidth MBR according to relative administrative weights are calculated at the level of input termination modules and are sent to the output termination modules. Distribution of corresponding grants of bandwidth by the output termination modules to the input termination modules is also done according to relative administrative weights as explained further on.

As indicated above according to the invention, the method for sharing internal excess bandwidth is obtained with an improved internal distributed rate based flow control IDRFC function taking in account relative administrative weights k in relation with the needs for bandwidth at the level of an input termination module.

The weighted IDFRC function according to the invention is an arbiter function which is preferably located at the level of the control processing unit in every termination module, such control processing units which are not illustrated here, being, for instance, based on digital signal processors DSP.

According to the invention, every VIEP/QOS queue, i. e. queue unit or scheduling unit, in every input termination module ITM performs a per administrative weight k accounting of its needs for bandwidth NFB.

Such a calculation is for instance based on the following formula:

$$NFB = Fq*Q + fs*S; \text{ with}$$

Q corresponding to the VIEP/QOS queue filling level; and

S corresponding to IDFRC regulated traffic which will be sent in the current IDFRC cycle; and Fq, fs being parameters having, respectively, "1" and "−1" for typical value. IDFRC cycle is for instance equal to 1 ms.

Every input termination module, such as ITMi, calculates a minimum band request $MBR_{i,j,k}$, in relation with every pipe, such as $VIEP_{i,j}$ and for every administrative weight k considering a flow from this input termination module ITMi to output termination module OTMj.

The minimum band requests calculated by an input termination module ITMj for a determined pipe $VIEP_{i,j}$ are transmitted by a so-called "flow 1" message from this termination module to output termination OTMj, where they are taken in account for bandwidth distribution. In a preliminary step to the calculation of needs for bandwidth factors, eligible bandwidth request factors EBR, such as $EBR_{i,j,k}$, are calculated in relation with need for bandwidth factors NFB and available bandwidth A at the port of an input termination module, in order to distribute this available bandwidth according to these eligible bandwidth factors.

According to the distribution law which is chosen, available bandwidth A is distributed amongst the eligible bandwidth requests $EBR_{i,j,k}$ for obtaining minimum band requests MBR, such as $MBR_{i,j,k}$, granted in proportion to the relative administrative weights of the connections. For instance, if two connections have a same eligible bandwidth request EBR, but the second has an relative administrative weight which is four times higher than the relative administrative weight of the first one, there will be four times more minimum band request allowed to the second one.

A sum value SEBRi,k is calculated with:

$$SEBRi,k = SUMj(EBRi,j,k)$$

the bandwidth allocation for a given weight is limited to the SEBRi,k value.

A minimum value Min1 of $\{(SEBRi,1)/w1, (SEBRi,2)/w2, \ldots, (SEBRi,K)/wK\}$ is then calculated with available bandwidth A assumed to be such as:

$$A > Min1*(w1+w2+ \ldots +wK)$$

If for instance SEBRi,2 is fully granted, as a consequence $$MBRi,j,2 = EBRi,j,2$$

If the above minimum is valid for k=2 and for K=8 then bandwidth is distributed according to the remaining contributors:

$$A-SEBRi,2=*(w1+w3+ \ldots +wK)$$

till the minimum of:

$$\{(SEBRi,1)/w1, (SEBRi,3)/w3, \ldots, (SEBRi,K)/wK\}$$

and so on until A is reached or all the SEBRi,k are granted. When A is reached in the second step, then:

$$MBRi,j,1=(EBRi,j,1)/SEBRi,1*[SEBRi,2*w1/w2+(A-SEBRi,2)*w1/(w1+w3+ \ldots +w8)]$$

$$MBRi,j,3=(EBRi,j,1)/SEBRi,1*[SEBRi,2*w3/w2+(A-SEBRi,2)*w1/(w1+w3+ \ldots +w8)]$$

. . .

Figure 2:
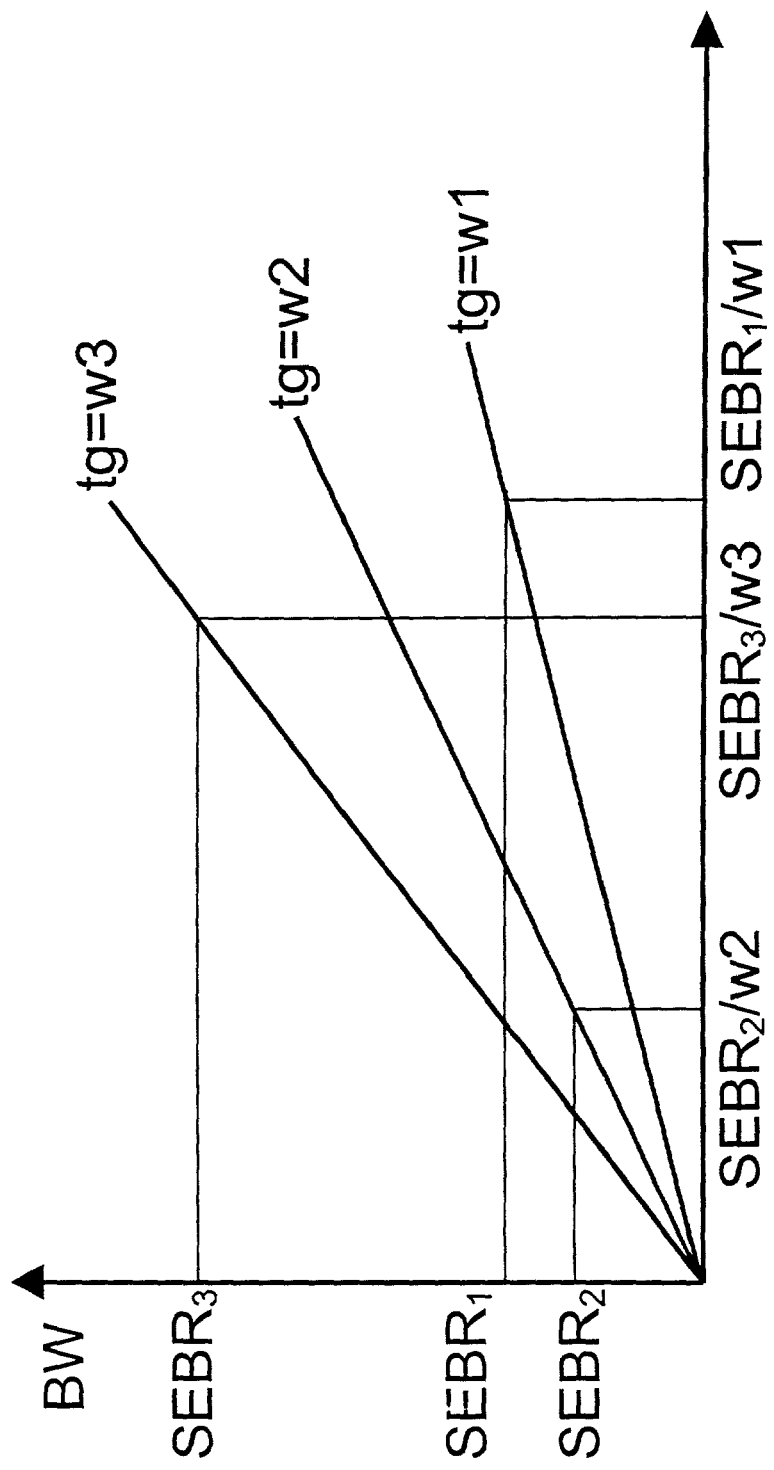
FIG. 2 is a simplified example relating to bandwidth distribution taking in account three administrative weights.

A simplified illustration of the bandwidth to be distributed in relation with a configuration involving three relative administrative weights is illustrated on FIG. 2.

The distribution goes on as long as A is not reached or as the entire sum SEBRi,k is not granted.

Calculation of bandwidth grant factors BGF at the level of an output termination module follows a way similar to computation of minimum bandwidth request MBR at the level of an input termination module.

The sum SMBRj,k is equal to SUMi (MBRi,j,k) and allocation of bandwidth is limited to the SMBRj,k value.

Calculation is made of:

Min1 of $\{(SMBRj,1)/w1,(SMBRj,2)/w2, \ldots, (SMBRj,K)/wK\}$ assuming $B > Min1*(w1+w2+ \ldots +wK)$, the remaining bandwidth is then distributed according the remaining contributors along the same pattern.

If, as in the example chosen above K=8, and the minimum is valid for k=2

$B-SMBRj,2=*(w1+w3+ \ldots +w8)$; and
the grant of bandwidth BW=SMBRj, 2 till the minimum Min2 of $\{(SMBRj,1)/w1, (SMBRj,3)/w3, \ldots, (SMBRj,8)/w8\}$ and so on until B is reached or all the SMBRj,k are granted.

When B is reached in the second step then:

$$BW \text{ grant } j,1=(SMBRj,2)/w2*w1+(B-SMBRj,2)*w1/(w1+w3+ \ldots +w8)$$

$$BW \text{ grant } j,3=(SMBRj,2)/w2*w3+(B-SMBRj,2)*w3/(w1+w3+ \ldots +w8)$$

The handling of the supplementary bandwidth requests is done as previously described. Finally also the blade weights are similarly used as explained before and bandwidth grant factors per relative administrative weight are redistributed to the input termination modules.

It has to be remarked that although the above preferred embodiment is described in a broadband communication network, the present invention is not restricted to this kind of communication network. Indeed, it is clear to a person skilled in the art to adapt the above described embodiment in order to have it applicable to other telecommunication networks, such as for instance an IP Internet Protocol communication network or an optical communication network.

The invention claimed is:

1. A method for sharing internal excess bandwidth between output termination modules and input termination modules of a switching network including a switch core fabric (FC) by means of which a plurality of N input termination modules (ITM1 to ITMn) communicate with a plurality of M output termination modules (OTM1 to OTMm) through at least point-to-point transmission means considered as corresponding each to a virtual ingress-to-egress pipe (VIEP), excess bandwidth sharing being realized for the bandwidth remaining available after bandwidth reservation for traffic with guaranteed bandwidth, sharing of such a remaining bandwidth being obtained by means of successive steps including at least
   calculating by a determined input termination module a minimum bandwidth request (MBR) for an ingress-to-egress pipe by which it is point-to-point linked to a determined output termination module, and
   transmitting said minimum bandwidth request to the determined output termination module for obtaining a minimum bandwidth grant (MBG) in return from this output termination module,
   wherein the minimum bandwidth request and grant related to an input termination module linked by an ingress-to-egress pipe to an output termination module are both calculated for a determined number K of relative administrative weights corresponding each to a different quality of service, with a different request and a corresponding grant for every weight.

2. A switching network including a switch core fabric (FC) by means of which a plurality of N input termination modules (ITM1 to ITMn) communicate with a plurality of M output termination modules (OTM1 to OTMm) through at least point-to-point transmission means considered as corresponding each to a virtual ingress-to-egress pipe (VIEP), said switching network including means for sharing a bandwidth which is available at the switch core fabric among input termination modules according to requests of said input termination modules and according to traffic possibilities at said output termination modules in relation with a present traffic situation, said switching network including bandwidth reservation means for traffic with guaranteed bandwidth, said means for sharing the available bandwidth including means for sharing excess bandwidth remaining available after bandwidth reservation for said traffic with guaranteed bandwidth, according to successive steps including at least a minimum bandwidth request calculation step by a determined input termination module for an ingress-to-egress pipe by which it is point-to-point linked to a determined output termination module, said minimum bandwidth request being transmitted to the determined output termination module for obtaining a minimum bandwidth grant in return from this output termination module, said means for sharing excess bandwidth being characterized in that they comprise means for calculating minimum bandwidth requests and grants related to an input termination module linked by an ingress-to-egress pipe to an output termination module, for a determined number K of relative administrative weights corresponding each to a different quality of service, with a request and a grant calculated for each weight.

3. A communication network characterized in that it comprises at least one switching network according to claim 2.

* * * * *